United States Patent
McClure et al.

(10) Patent No.: US 6,877,303 B2
(45) Date of Patent: Apr. 12, 2005

(54) STUB AUGER SUPPORT USED IN PICKUP

(75) Inventors: John R. McClure, New Holland, PA (US); William Dale Hotaling, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/198,745

(22) Filed: Jul. 19, 2002

(65) Prior Publication Data

US 2004/0011016 A1 Jan. 22, 2004

(51) Int. Cl.$^7$ .............................................. A01D 75/00
(52) U.S. Cl. ...................................................... 56/341
(58) Field of Search ...................... 56/341, 364; 100/88

(56) References Cited

U.S. PATENT DOCUMENTS

| | | | | |
|---|---|---|---|---|
| 3,641,754 A | * | 2/1972 | Anstee | 56/341 |
| 3,742,689 A | * | 7/1973 | Barows et al. | 56/226 |
| 3,780,506 A | * | 12/1973 | Tashiro | 56/14.5 |
| 4,300,333 A | * | 11/1981 | Anderson | 56/14.5 |
| 4,344,271 A | * | 8/1982 | Schlueter et al. | 56/13.6 |
| 4,353,201 A | * | 10/1982 | Pierce et al. | 56/364 |
| 4,525,991 A | | 7/1985 | Naaktgeboren | |
| 4,567,820 A | * | 2/1986 | Munsell | 100/65 |
| 4,644,739 A | | 2/1987 | Robb | |
| 4,928,462 A | | 5/1990 | Lippens et al. | |
| 4,999,987 A | * | 3/1991 | Eggenmueller | 56/341 |
| 5,005,342 A | * | 4/1991 | Lundahl et al. | 56/10.2 R |
| 5,052,170 A | * | 10/1991 | Trenkamp et al. | 56/341 |
| 5,054,387 A | | 10/1991 | Diederich, Jr. et al. | |
| 5,819,516 A | | 10/1998 | Anderson et al. | |
| 5,822,959 A | * | 10/1998 | Norton | 56/1 |
| 5,842,335 A | | 12/1998 | Esau | |
| 5,848,523 A | * | 12/1998 | Engel et al. | 56/341 |
| 5,855,167 A | | 1/1999 | Goossen et al. | |
| 6,029,434 A | | 2/2000 | Ratzlaff et al. | |
| 6,058,688 A | * | 5/2000 | Krambeck et al. | 56/14.5 |
| 6,321,518 B1 | * | 11/2001 | O'Hagan | 56/294 |

* cited by examiner

Primary Examiner—Thomas B. Will
Assistant Examiner—Alicia Torres
(74) Attorney, Agent, or Firm—John William Stader; Collin A. Webb

(57) ABSTRACT

An agricultural crop processing machine, including a processing apparatus having a width; a crop pickup located forwardly of the crop processing apparatus and having a width greater than that of the crop processing apparatus; at least one auger having an axial core wherein the core has a drive wheel or sprocket at one end; and first and second bearing supports are disposed to journal the core and disposed inward of the drive wheel or sprocket. In a preferred embodiment, both bearing supports are inwardly disposed of the auger drive sprocket, which decreases the overall pickup width so as to increase the tine row-to-overall pickup width. A deflector plate acts as a bearing support and deflects crop material to allow for a shorter auger screw. A pickup cam drive wheel or sprocket and the auger drive wheel or sprocket are disposed in substantially the same plane.

17 Claims, 5 Drawing Sheets

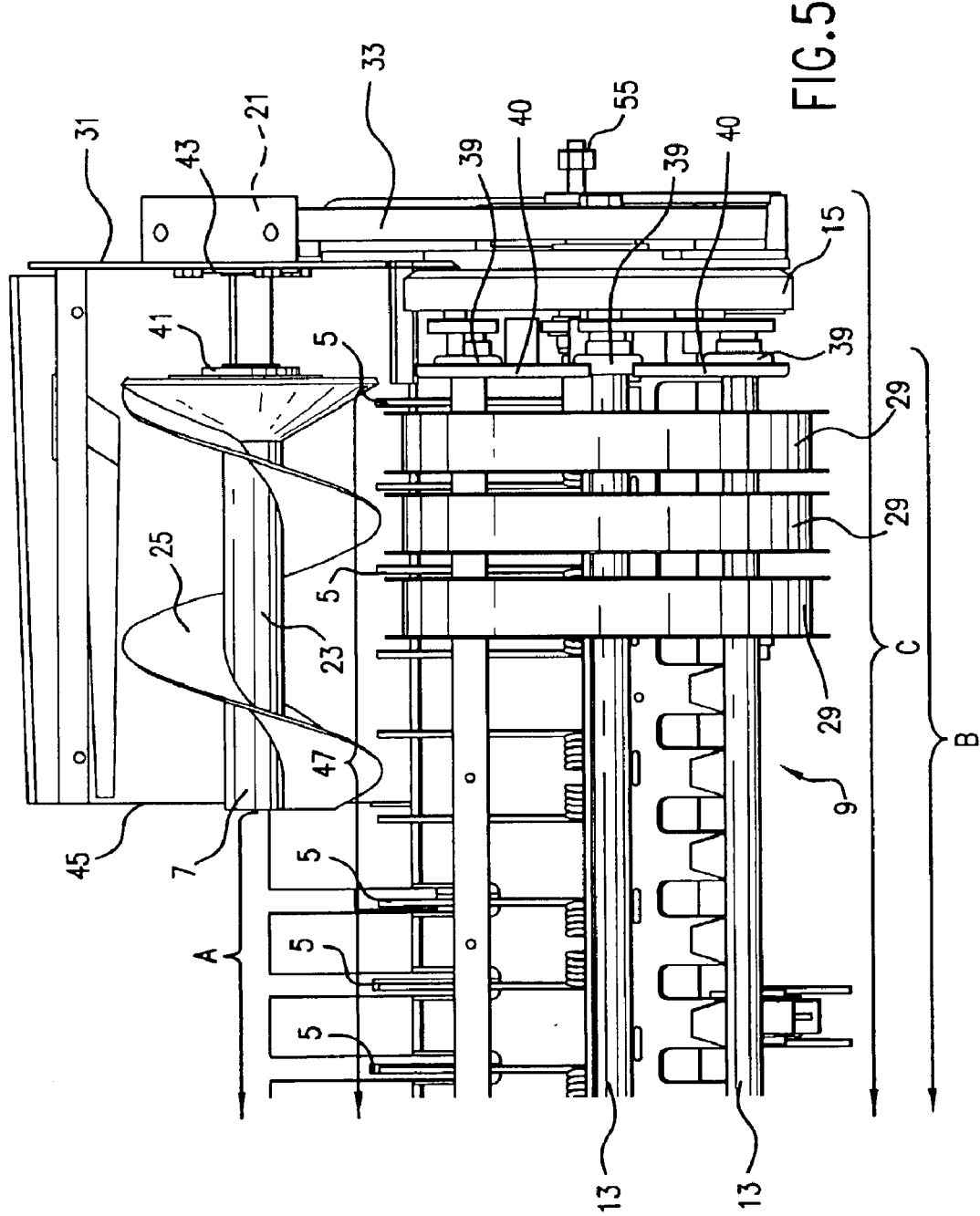

STUB AUGER SUPPORT USED IN PICKUP

FIELD OF THE INVENTION

The present invention relates to pickups in mechanical harvesters, and more particularly, to stub auger supports used in pickups for the baling of forage.

BACKGROUND OF THE INVENTION

Windrows of cut crop material are typically rounded at their lateral margins and progressively slope down from a maximum height at the center to a minimum height at their edges. As a consequence, when windrows are gathered to form bales by balers, the finished bale tends to be larger in the center than at its opposite ends. To correct this tendency, more material can be added to the outer edges of the windrow, such as by laying down a pair of windrows side-by-side to produce one large "double windrow". However, adding a second windrow alongside the first sometimes causes the windrow to be too wide, so that a standard pickup cannot reach the widest portions of the windrow unless it is equipped with gathering wheels or other suitable devices. Such products converge and consolidate the materials while they are still on the ground, just ahead of and before engagement by a pickup of a baler.

Another way of providing the capability of handling wide windrows is to design the baler for two-stage feeding from the ground to the baling chamber. In this approach the pickup serves as the first stage of the feeding mechanism and is wider than the bale chamber, so that the pickup can easily reach and accept all portions of the wide windrow. Specifically, this first stage is accomplished as a widened row of rotating tines lift forage onto the pickup header. Once picked up, the crop material is then converged toward the center by a pair of oppositely disposed stub augers. The materials is then delivered into the baling chamber by a second stage conveying device, such as a stuffer having stuffing forks, a rotor having rotating blades or another equivalent conveying device.

Unfortunately, the auger support mechanism of these types of widened pickups having auger screws, are appreciably wider than the width of the row of tines that ultimately defines the operable width of a windrow pickup. In other words, the overall pickup header width is considerably greater than its operational width, at least in part, due to the width of the components placed on both sides of the pickup, which are outside of its operational width. That is, the width of the row the spinning tines that actually pickup up crop material is narrower than the overall width of the device. The conventional arrangement of these components typically includes a cam to drive the tines, and two auger bearing supports that sandwich a drive sprocket. This construction tends to make the overall pickup header unit too wide, however. As a result, the header unit is less compact, thereby allowing a less efficient and lower yielding forage pickup.

One important feature of the related mechanism is that the augers have sufficient support for their bearings. It has been found that one bearing support is simply insufficient to hold a rotating auger, and as such two supports are generally deemed necessary. The conventional wisdom is that the power pickup, e.g., a drive sprocket, for each auger should be placed between the two bearings.

Moreover, it has been found that augers have a tendency to become clogged with, or blocked by crop material such as forage or hay as the augers feed an overabundance of forage from the tines and into the crop conveyers, e.g. the stuffers or rotors. It would be useful to minimize the occurrence of such blockage, because it often times requires that the operator halt the baling process to manually unclog the augers.

Another important aspect of this mechanism is the need for maximizing the tine-to-tine width, i.e., the width of the row of tines, while at the same time maintaining the overall pickup width to conform to various practical and regulatory requirements concerning baler pickup width. Some jurisdictions place limits on the overall width of farm machinery authorized to travel or be transported on roadways. Thus, it is important for a given allowed width of vehicle, that the amount of maximum usable width be maximized.

Hence there is a need for an improved pickup header that is more compact. In particular, there is a need for a pickup header that conforms to both European and United States shipping regulations, and general European Union farming regulations, regarding maximum baler pickup width. Of course, an improved pickup must maximize its operational width so as to increase forage-baling efficiency, e.g., when baling large or even two windrows. Such a pickup would also minimize crop material blockage of the auger screws.

Accordingly, one object of the present invention is to overcome present limitations in the prior art that restrict the ratio of useable tine-to-tine operational width, to, the overall width of the pickup.

Another object of the present invention is to provide a baler having a pickup with augers less prone to blockage by an overabundance of forage material.

SUMMARY OF THE INVENTION

In accordance with the above objects and other objects, which will be readily apparent to one having skill in the art, the present invention provides an agricultural crop processing machine, including a processing apparatus having a width; a crop pickup located forwardly of the crop processing apparatus and having a width greater than that of the crop processing apparatus; at least one auger having an axial core wherein the core has a drive wheel or sprocket at one end; and first and second bearing supports disposed to journal the core and disposed inward of the drive wheel or sprocket.

According to a further embodiment of the invention, the present invention has a drive belt or chain that engages said drive wheel or sprocket, and a belt or chain guard that defines an outside width of the pickup.

According to a further embodiment, the present invention further comprises a crop pickup cam bearing support, and a cam drive wheel or sprocket driven by said belt or chain, wherein the cam drive wheel or sprocket and said drive wheel or sprocket of the auger are disposed substantially in the same plane.

According to yet another embodiment, the present invention has a row of pickup tines defining a width, and an auger flange that does not outwardly extend beyond the width of the pickup tines.

According to a still further embodiment of the invention, the first and second bearing supports comprise planar sheets.

According to yet another embodiment, the present invention has a feeding chamber wherein the second bearing support journals the auger core adjacent to the feeding chamber.

According to a still further embodiment of the invention, the first bearing support is a pickup side sheet.

According to yet a further embodiment of the invention, said second bearing support is disposed at an angle with respect to a direction of incoming crop material.

In accordance with a still further embodiment of the present invention, there is provided an agricultural crop processing machine, including a crop processing apparatus having a width; a crop pickup located forwardly of the crop processing apparatus and having a width greater than that of the crop processing apparatus; at least one auger having an axial core wherein the core has a drive wheel or sprocket at one end; and at least one bearing support disposed to journal the core and disposed inward of the drive wheel or sprocket.

According to a further embodiment, the present invention has the present invention has a drive belt or chain that engages said drive wheel or sprocket, and a belt or chain guard that defines an outside width of the pickup.

According to a further embodiment, the present invention has a drive belt or chain that engages said drive wheel or sprocket, and a belt or chain guard that defines an outside width of the pickup.

According to a still further embodiment, the present invention has a row of pickup tines having a width, and an auger flange that does not outwardly extend beyond the width defined by the row of pickup tines.

According to yet a further embodiment of the invention, the at least one bearing support comprises a planar sheet.

According to a still further embodiment, the present invention has a feeding chamber wherein the at least one bearing support journals the auger core adjacent to the feeding chamber.

According to yet another embodiment of the invention, said second bearing support is disposed at an angle with respect to a direction of incoming crop material.

In accordance with still another embodiment, the present invention provides an agricultural crop processing machine, including a crop processing apparatus having a width; a crop pickup located forwardly of the crop processing apparatus and having a width greater than that of the crop processing apparatus; an auger having an axial core, and a wheel or sprocket at one end; a plurality of pickup tines; a crop deflecting plate having a width in a direction of said pickup width; a cam having a width in the direction of said pickup width; a cam wheel or sprocket connected to drive the cam; a pickup side sheet; and a drive belt or chain. In this embodiment, the tines are disposed inward of the cam and deflecting plate, the cam and deflecting plate are disposed inward of the pickup side sheet, and the pickup side sheet is disposed inward of the drive belt or chain. In addition, the drive belt or chain is connected to drive the auger wheel or sprocket and the cam wheel or sprocket in substantially the same plane.

According to yet another embodiment of the invention, the cam and the crop deflecting plate overlap one another along the width of the pick up.

According to still another embodiment of the invention, the width of the crop deflecting plate is co-extensive with the width of the cam along the width of the pick up.

According to yet another embodiment of the invention, the deflecting plate is a bearing support for the auger core.

Further objects, features, and advantages of the present invention will become apparent from the Detailed Description of Preferred Embodiments, which follows, when considered together with the attached drawings.

BRIEF DESCRIPTION OF THE DRAWINGS

FIG. 5 is a frontal drawing of a partially assembled pickup in accordance with a preferred embodiment of the present invention.

DETAILED DESCRIPTION OF PREFERRED EMBODIMENTS

Figure 1:
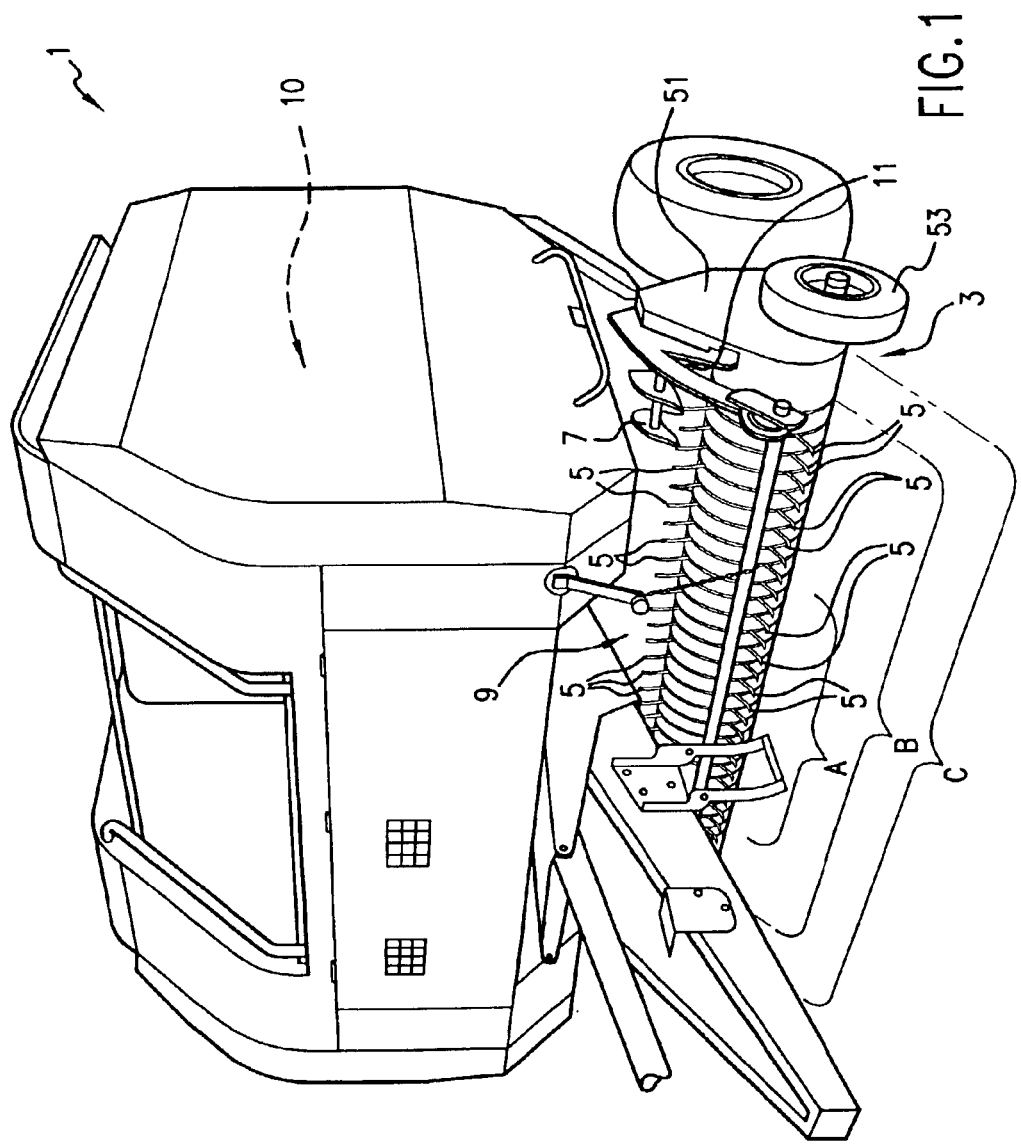
FIG. 1 is an agricultural harvester in accordance with a preferred embodiment of the present invention.

The preferred embodiments will now be described with reference to the figures in which like parts are indicated by like reference numerals. In accordance with the preferred embodiments of the present invention, FIG. 1 illustrates a round baler 1 having a pickup 3 equipped with a row of tines 5 and auger screw 7. As the baler 1 is pulled over a windrow or multiple windrows, tines 5 rotate forwardly along the ground to lift forage. Once the tines 5 lift forage off of the ground and onto a crop feeding transition area on top of the header 9, crop material is fed into a crop processing apparatus 10, preferably a baling apparatus. This feeding is done either directly, such as in a case for crop material aligned with the center of the row of tines 5, or indirectly, through the operation of crop transition elements such as an auger screw 7 and crop deflecting auger screw bearing support plate 11.

To fully appreciate the operation of pickup 3 it is useful to know the relative widths of the mouth of the crop processing apparatus 10 (width A), baling apparatus, the row of tines 5 (tine-to-tine width B), and the overall pickup (width C). As seen in FIG. 1, the width A of the mouth of processing apparatus 10 is substantially narrower than the operational portion of the pickup width B defined by the row of tines 5. This configuration allows the collection of wider windrows and in some cases, two windrows laying side-by-side. One technique often used is to drag the baler 1 over a single windrow in a zigzag formation causing alternate sides of a bale to be built up. In this manner, an operator draws one side of the row of tines 5 over a single windrow. Accordingly, that side of the bale is built up in the bale forming apparatus of baler 1. The operator then repositions the baler so that the windrow is fed into the baler 1 at the opposite side of the pickup 3 by the other side of the row of tines 5, thereby causing a corresponding side of the bale to be built up. This technique allows more even crop distribution in the bales, in a quicker and more efficient manner. In any case, the pickup 3 operational width to baler mouth ratio seen in FIG. 1 and illustrated as width B as compared to width A, allows a number of baling techniques that incorporate the capability of picking up and baling wider, and even double, windrows. To pick up wider windrows, therefore, it is useful to maximize the tine-to-tine width B. As was mentioned above, jurisdictional limitations limit the overall pickup width C, so that it is desirable to maximize the tine-to-tine width B within the legal or practical limitations of the overall width C.

Figure 2:
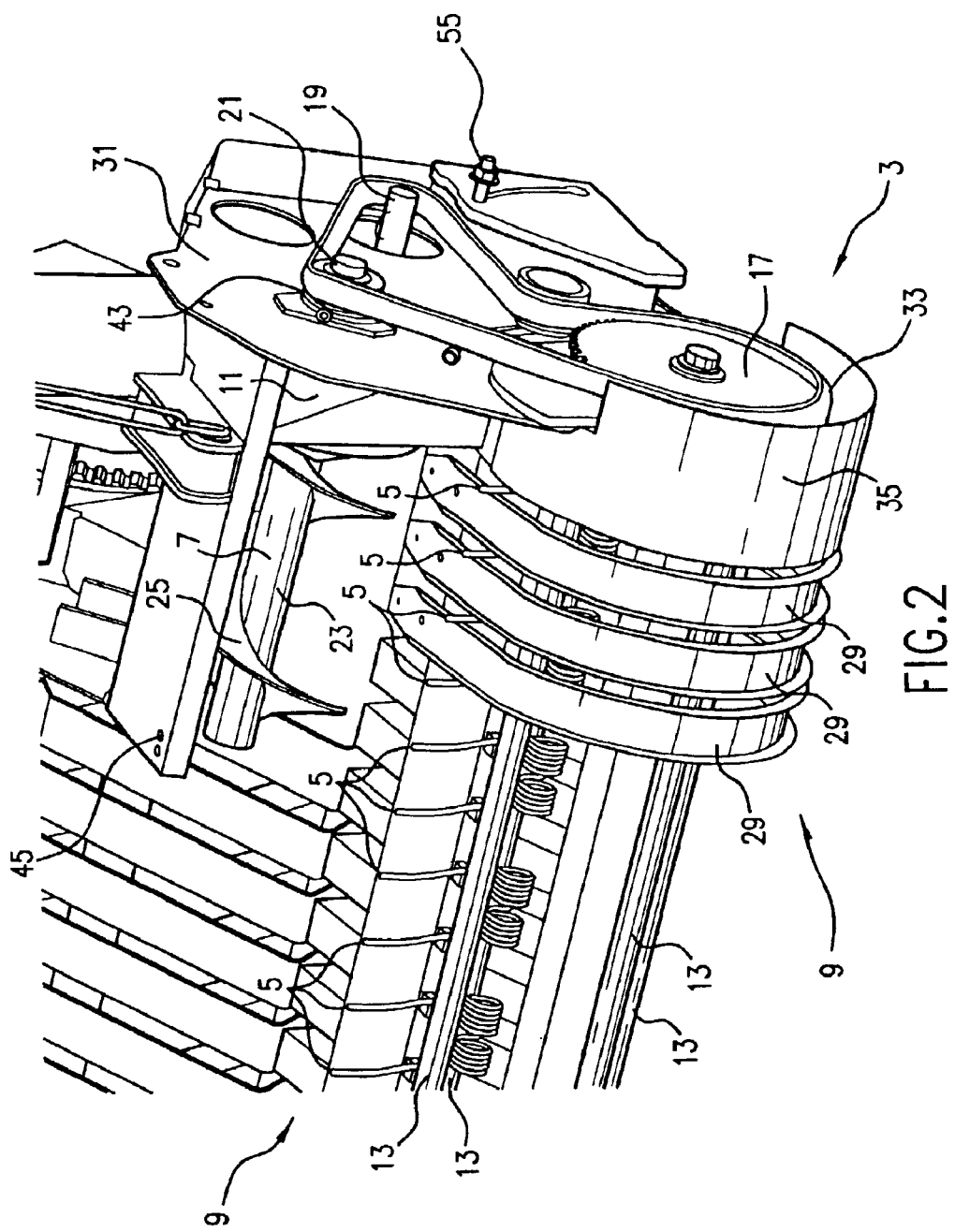
FIG. 2 is a perspective drawing of a partially assembled pickup in accordance with a preferred embodiment of the present invention.

In addition, certain mechanical components required for the operation of pickup 3 are typically disposed on the ends of row of tines 5, which further tends to widen the overall pickup width C. On one end of row of tines 5, these components may include for example, a cam 15, an auger drive sprocket 21 and cam drive sprocket 17 having an interconnecting drive chain 33, and a form of external housing for these components (not shown) as illustrated in FIG. 2. Together, these components rotate both tines 5, which pick up crop material, and auger screw 7, which transitions crop material into the mouth of the baler 1. As such, the overall pickup width C includes the width of two sets of these components, one set on each end of pickup 3, as well as the operational tine-to-tine width B.

Despite the functional necessity for certain components (such as but not necessarily, these exemplary components) in the overall structure of the device, both legal and practical reasons call for the maximization of tine-to-tine width B as compared with the overall pickup width C. After all, a larger operational pickup width, which is defined by the tine-to-tine width B, allows a gathering of the most crop material in the most efficient manner. On the other hand, regulations regarding shipping, and practical constraints regarding storage of the balers, including the pickups attached thereto, call for narrower pickups. In fact, both the United States and European Union have set forth maximum overall widths for highway transport items, these items including of course, agricultural balers. In addition, the Member States of the European Union require that farming tractor and agricultural processing machine widths be no more than 2.55 meters. Accordingly, the present invention endeavors to maximize the operational tine-to-tine width B, while complying with regulatory and practical constraints on the overall pickup width C.

As seen in FIG. 2, a partially disassembled pickup 3 in accordance with a preferred embodiment of the invention includes a row of tines 5 mounted on a plurality of elliptically revolving tine mounts 13, which are mounted on cam 15 (not shown). Cam 15 (seen in FIGS. 3 and 5) is driven by cam sprocket 17. Likewise, auger screw 7, which includes rotating axial core 23 and flange member 25, is driven by drive sprocket 21. While operating, tines 5 lift forage material and place on header 9 slats 29. (Despite the depictions of partially assembled pickups 3 in FIGS. 2, 3, and 5, it is noted that in a preferred embodiment, slats 29 exist in side-by-side fashion along the entire width of the row of tines 5). Forage material is then transitioned in part towards the mouth of the baler by the rotating flange member 25, which pushes the crop material inwardly to the mouth of the baler 1 where rotors, stuffers, or the like conveyors push the hay or forage, for example, into the bale forming chamber. On one side of pickup sidewall sheet 31 crop material is fed into the mouth of the baler and on the other side drive shaft 19 drives cam sprocket 17 and auger screw 7 simultaneously via drive chain 33.

Figure 3:
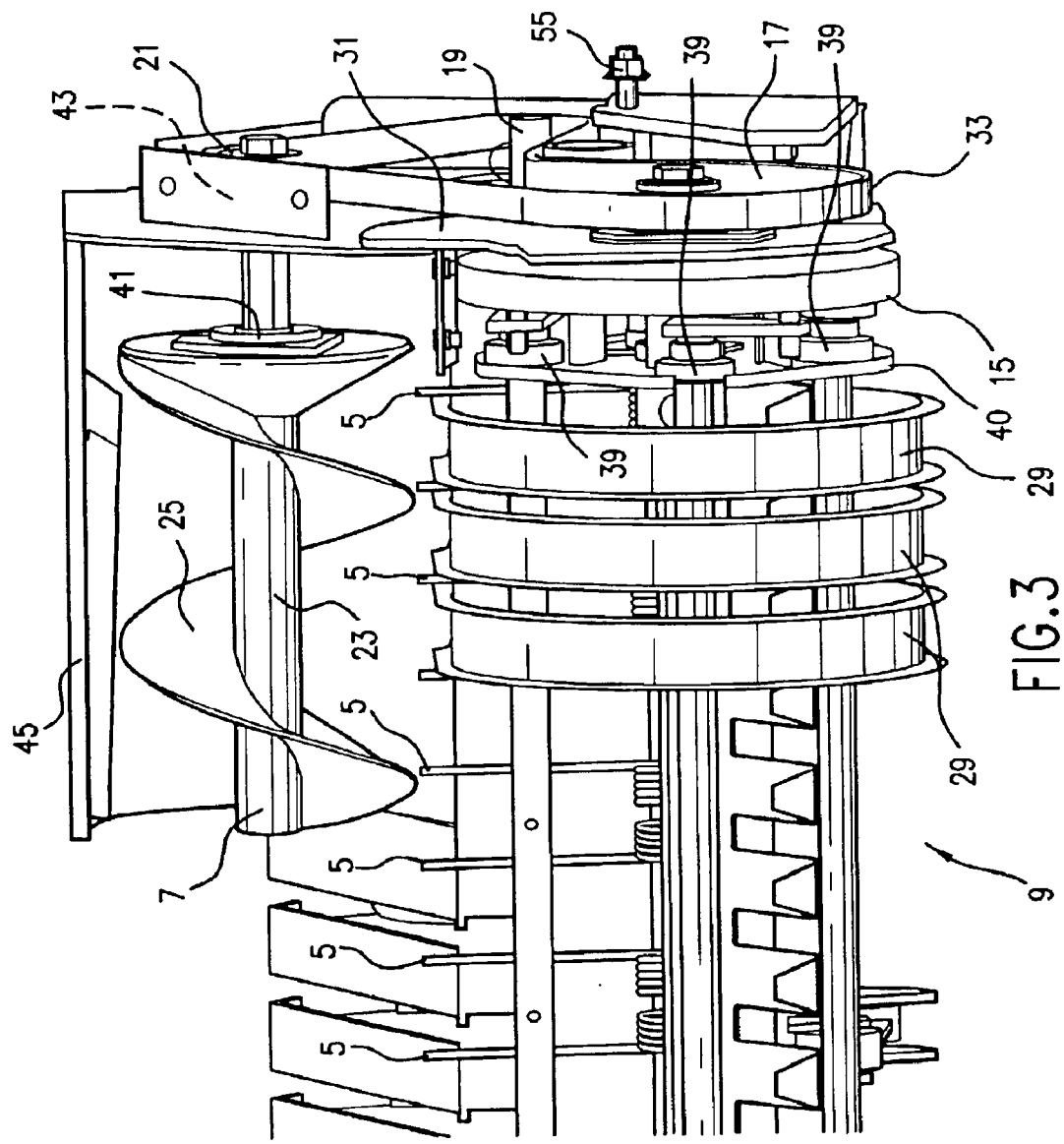
FIG. 3 is a perspective drawing of a partially assembled pickup in accordance with a preferred embodiment of the present invention.
Figure 4:
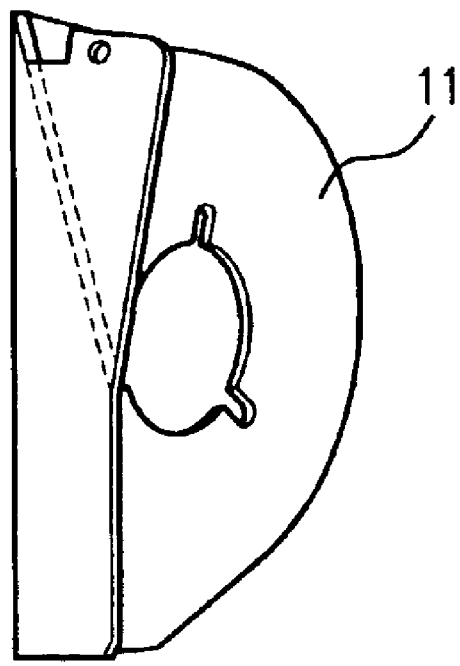
FIG. 4 is a perspective drawing of a bearing support in accordance with the preferred embodiment of the present invention of FIG. 3.

As seen in FIG. 3, stub auger screw 7 is mounted on two bearing support plates, namely, a pickup sidewall 31 and a crop material deflecting plate 11, the later of which is separately illustrated in FIG. 4 and operationally illustrated in FIG. 2. As seen in FIGS. 3 and 5, deflecting plate 11 and cam shield 35 are removed to reveal cam bearings 39 and both internal 41 and external 43 stub auger screw 7 bearings. Now referring to FIGS. 3 and 4, bearing support plate 11 serves at least two important purposes. It journals and supports stub auger screw 7. In the present embodiment, bearing support 11 form-fits the interior wall of auger screw housing 45. This snug fit, coupled with welded connections to the auger screw housing 45 and pickup sheet 31, firmly positions support 11 to function as a bearing support for auger screw 7.

As seen in FIG. 2, the angularly disposed deflecting plate bearing support 11 also provides inward deflection of incoming crop material, and thereby facilitates additional transitioning of crop material to the crop processing apparatus 10 (not shown). As tines 5 move in a known, elliptical pattern to pickup crop material, crop material on each end of the row tines 5 moves up and on top of cam shield 35 and hits an angularly positioned bearing support plate 11 (which like each of these components is preferably, but not necessarily, located on both sides of pick up 3) at which point the material is redirected inwardly toward the augers, which move the crop inward toward the mouth of the baler 1. Bearing support plate 11 is positioned in a substantially vertical position and maintain an angle with respect to the incoming flow of crop material, which allows deflection of such material inwardly and towards the mouth of the baler's crop processing apparatus. In a preferred embodiment, the position of plate 11 is angled between 30 and 70 degrees, and preferably 45 degrees, with respect to the direction of flow of incoming crop material.

It is noted that a preferred embodiment includes the above-described transition element and cam components configuration on both ends of pickup 3.

In accordance with a preferred embodiment of the present invention, therefore, it is seen that this configuration of auger screw bearing supports provides at least three great advantages over previous auger screw bearing support configurations. Previously, a second auger screw bearing support was placed outside of both auger screw drive sprockets. This increased the overall width of the pickup, limiting the useful width with regard to the above-mentioned regulations that restrict the overall width. As discussed above, this is disadvantageous because it tends to increase the overall pickup width as compared to the tine-to-tine width.

By contrast, it is seen that the present invention minimizes the overall width, while maximizing the overall useful tine-to-tine width. As seen particularly in FIG. 5, the internal bearing support 41 is disposed in line with cam bearing support 40 such that the former component is adjacent to the feeding chamber 47, and the latter is under the feeding chamber 47. Thus, the feeding chamber 47 includes not only the space inward of plate 11, but also space over cam guard 35. This configuration does away with the conventional need to place a bearing support outside of sprocket 21. Therefore, by making both auger screw bearing supports coextensive with cam bearings 39, the overall pickup width C is decreased. Accordingly, chain guard 51 (one seen in FIG. 1) comprises an exterior side of pickup 3. Relatively inconsequential to overall pickup width C is protruding wheel mount 55 onto which wheel 53 is removably and easily attached. Moreover and as seen in FIG. 1, wheel 53 is easily removed to decrease overall baler width for transport or storage.

Secondly, in previous applications of an auger screw transition element, the total length of the auger screw extended outwardly to the far internal sidewall of a pickup side sheet such as pickup side sheet 31. Regarding the length of the auger screw, the present invention now enables a shorter auger screw 7 than previous auger screw bearing support configurations had allowed. This in turn reduces crop blockage in the auger screws. It has been found that longer auger screws tend to become blocked by an excessive or overabundance of forage material fed therein. In a preferred embodiment, however, the additional deflection of crop material provided by support plates 11, as opposed to the use of an auger screw, and what is more a longer auger screw, alone, helps to avoid this problem. Rather than requiring the auger screw to redirect all of the crop material at a 90 degree angle with respect to the flow of incoming crop material, bearing support plate 11 redirects a substantial portion of the crop flow towards the baler mouth, thereby reducing the angle of incidence of this crop material on auger screw 7. This redirection, when coupled with a shorter stub auger screw 7, helps to ensure an efficient and blockage free transitioning of crop material from the tines 5 to the baling apparatus 10.

A third advantage of a preferred embodiment includes easy access to drive sprockets 21 and 17, drive chain 33, and drive shaft 19 simply by removing chain guard 51.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

We claim:

1. An agricultural crop processing machine, comprising:
   a processing apparatus having a width;
   a crop pickup located forwardly of the crop processing apparatus and having a width greater than the width of the crop processing apparatus;
   at least one auger having a flange and an axial core extending past the flange at one end, wherein the core has a drive wheel or sprocket at the one end;
   first and second bearing supports disposed to journal the core and disposed outward of the flange and inward of the drive wheel or sprocket;
   a drive belt or chain that engages said drive wheel or sprocket; and a belt or chain guard that defines an outside width of said pickup; and said second bearing support is disposed at an angle with respect to a direction of incoming crop material.

2. The agricultural processing machine of claim 1, further comprising a crop pickup cam bearing support, and a cam drive wheel or sprocket driven by said belt or chain, wherein the cam drive wheel or sprocket and said drive wheel or sprocket of the auger are disposed substantially in the same plane.

3. The agricultural processing machine of claim 1, further comprising a row of pickup tines defining a width, and an auger flange that does not outwardly extend beyond the width of the pickup tines.

4. The agricultural processing machine of claim 1, wherein said first and second bearing supports comprise planar sheets.

5. The agricultural processing machine of claim 4, further comprising a feeding chamber wherein said second bearing support journals said auger core adjacent to the feeding chamber.

6. The agricultural processing machine of claim 5, wherein said first bearing support is a pickup side sheet.

7. An agricultural crop processing machine, comprising:
   a crop processing apparatus having a width;
   a crop pickup located forwardly of the crop processing apparatus and having a width greater than that of the crop processing apparatus;
   at least one auger having a flange and an axial core extending past the flange at one end, wherein the core has a drive wheel or sprocket at the one end;
   at least one bearing support disposed to journal the core and disposed outward of the flange and inward of the drive wheel or sprocket;
   a drive belt or chain that engages and drive wheel or sprocket;
   a belt or chain guard that defines an outside width of said pickup; and
   said at least one bearing support is disposed at an angle with respect to a direction of incoming crop material.

8. The agricultural processing machine of claim 7, further comprising a crop pickup cam bearing support, and a cam drive wheel or sprocket driven by said belt or chain, wherein the cam drive wheel or sprocket and said drive wheel or sprocket of the auger are substantially disposed in the same plane.

9. The agricultural processing machine of claim 7, further comprising a row of pickup tines defining a width, and an auger flange that does not outwardly extend beyond the width of the pickup tines.

10. The agricultural processing machines of claim 7, wherein said at least one bearing support comprises a planar sheet.

11. The agricultural processing machine of claim 10, further comprising a feeding chamber wherein said at least one bearing supports journals said auger core adjacent to the feeding chamber.

12. An agricultural crop processing machine, comprising:
    a crop processing apparatus having a width;
    a crop pickup located forwardly of the crop processing apparatus and having width greater than that of the crop processing apparatus;
    an auger having an axial core, and a wheel or sprocket at one end;
    a plurality of pickup tines;
    a crop deflecting plate having a width in a direction of said pickup width;
    a cam having a width in the direction of said pickup width;
    a cam wheel or sprocket connected to drive the cam;
    a pickup side sheet; and
    a drive belt or chain;
    wherein the tines are disposed inward of the cam and deflecting plate, the cam and deflecting plate are disposed inward of the pickup side sheet, and the pickup side sheet is disposed inward of the drive belt or chain; and
    wherein the drive belt or chain is connected to drive the auger wheel or sprocket and the cam wheel or sprocket in substantially the same plane.

13. The agricultural crop processing machine of claim 12, wherein said cam and said crop deflecting plate overlap one another along the width of the pickup.

14. The agricultural crop processing machine of claim 13 wherein the width of the crop deflecting plate is co-extensive with the width of the cam along the width of said pick up.

15. The agricultural crop processing machine of claim 14 wherein said deflecting plate comprises a bearing support for said auger core.

16. An agricultural crop processing machine, comprising:
    a processing apparatus having a width;
    a crop pickup located forwardly of the crop processing apparatus and having a width greater than the width of the crop processing apparatus;
    at least one auger having a flange and an axial core extending past the flange at one end, wherein the core has a drive wheel or sprocket at the one end; and
    first and second bearing supports disposed to journal the core and disposed outward of the flange and inward of the drive wheel or sprocket, said first bearing support comprising a sidewall of said pickup, and said second bearing support comprising a crop material deflecting plate.

17. The agricultural processing machine of claim 16, wherein said pickup comprises a plurality of tines disposes in a row, the row of tines being disposed in a continuous crop opening.

* * * * *